Feb. 17, 1942.   R. F. PEO   2,273,535
CONTROL DEVICE FOR REFRIGERATING SYSTEMS
Filed May 8, 1939
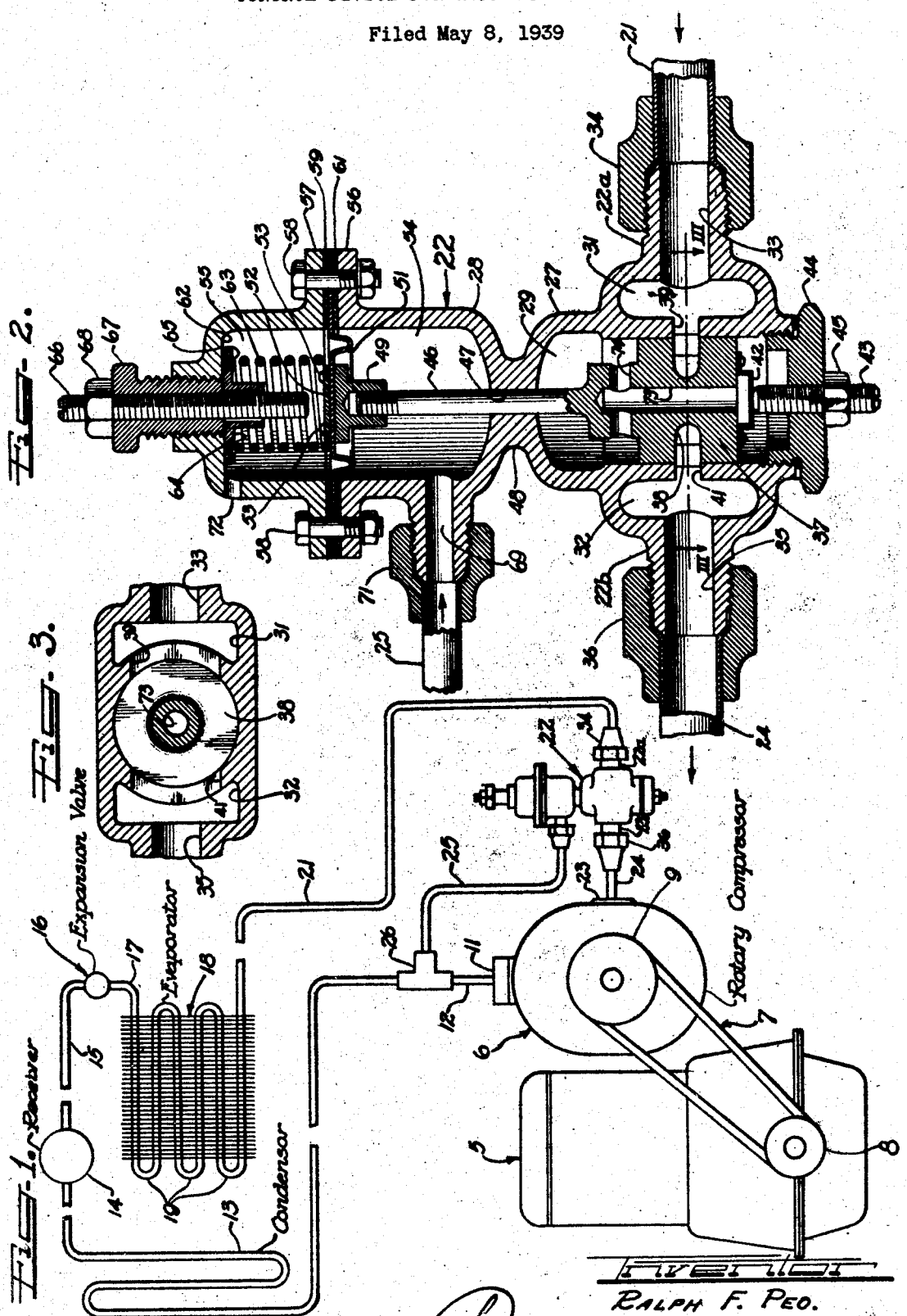
Inventor
RALPH F. PEO.

Patented Feb. 17, 1942

2,273,535

UNITED STATES PATENT OFFICE 2,273,535

CONTROL DEVICE FOR REFRIGERATING SYSTEMS

Ralph F. Peo, Buffalo, N. Y., assignor to Houde Engineering Corporation, Buffalo, N. Y., a corporation of New York Application May 8, 1939, Serial No. 272,302

2 Claims. (Cl. 137—153)

This invention relates to an automatic control means for a mechanical refrigerating system of the usual compressor-condenser-evaporator type which provides for a regulated flow of fluid refrigerant, and more specifically relates to a valve adapted for use in such a system which valve is so constructed that the fluid refrigerant flow through the suction or low pressure side of the compressor is automatically regulated by the pressure on the discharge or high pressure side thereof to maintain a constant pressure over a wide range of compressor speeds.

In refrigerating or air-conditioning systems of the type which operate on automotive vehicles, it is difficult to maintain a constant pressure within the system due to variations in the rate of condensation and evaporation caused by changes in atmospheric temperatures and by the breathing and body heat of passengers liberated within the vehicle. Difficulty also has been experienced by the changes in speed of the pressure producing compressor, usually driven by the vehicle motor which constantly accelerates and decelerates. To eliminate the latter difficulty, mechanical devices such as governor clutches have been used which permit the compressor to attain a certain maximum speed, after which the driving motor could be accelerated to any higher speeds necessary for vehicle propulsion without proportionately increasing the compressor speed.

These clutches are constantly being operated as the driving motor is accelerated and decelerated and are thus subjected to great wear. In addition they are set to disengage at high motor speeds even when the refrigeration system requires maximum compressor capacity.

The present invention now entirely eliminates the necessity for such governor clutches and the compressor can be directly connected to the vehicle motor.

It is therefore an important object of my invention to provide an automotive refrigerating or air-conditioning system so arranged that the compressor discharge pressure regulates the refrigerant flow through the suction line and maintains a constant discharge pressure regardless of the variations of compressor speed over a wide range.

Another object is to provide a refrigerating system so arranged that the compressor discharge pressure regulates the fluid flow through its suction line to compensate for any change in the discharge pressure resulting from change in compressor speeds or variations in condensation and evaporation.

A still further object of my invention is to provide a refrigerating system so arranged that the compressor discharge pressure regulates the intake refrigerant flow through a valve thereby resulting in a constant discharge pressure over a wide range of compressor speeds.

Yet another object is to provide a refrigerating system so arranged that pressures existing in the high side thereof regulate the flow of refrigerant into the compressor inlet side in such a manner as to maintain a constant compressor discharge pressure over a wide range of driving motor speeds.

A still further object is to provide a pressure responsive valve to regulate flow of refrigerant into a compressor.

Another object of this invention is to provide a refrigerating system for cooling automotive vehicles that is directly driven from the motor of such vehicles.

Other and further objects of this invention will be apparent from the following detailed description of the annexed sheet of drawings which discloses a preferred embodiment of the invention.

On the drawing:

Figure 1 is a diagrammatic view of a refrigerating system having a control valve incorporated therein according to this invention;

Figure 2 is an enlarged vertical cross sectional view, with parts in elevation, of the control valve; and Figure 3 is a fragmentary horizontal cross-sectional view taken substantially along line III—III of Figure 2.

As shown on the drawing:

Figure 1 illustrates a refrigerating system of the compressor-condenser-evaporator type for an automotive vehicle. In Figure 1 the reference numeral 5 indicates the vehicle motor which drives a compressor 6 through an endless belt 7 passing over driving pulley 8 and driven pulley 9.

The compressor 6, which compresses the refrigerant for circulation in the system, is formed to provide a discharge outlet 11 for flowing the compressed refrigerant through a tube 12 into a condenser 13, wherein the compressed refrigerant is cooled by air flowing around the condenser and is liquefied. The liquefied refrigerant then flows into a receiver 14, where it is collected for use. From the receiver 14, the refrigerant then flows through a tube 15 into an expansion valve 16, where it is expanded into the low pressure side of the system through a tube 17 into an evaporator unit 18 wherein the fluid passes through the heat exchanger tubes 19 and cools these tubes for performing the refrigerating function.

The spent, expanded refrigerant then flows through a tube 21 into the inlet 22a of a control valve 22 having the outlet 22b thereof connected to the compressor suction inlet 23 by a tube 24. Control valve 22 is operated by the discharge pressure of the compressor 6 by tapping a tube 25 into the discharge line 12 through a T 26, or some other suitable connection. When the spent refrigerant is received by the compressor 6 through the low pressure inlet 23, it is again compressed and circulated through the system as described above, resulting in a continuous flowing circuit except when the valve 22 is fully closed.

The control valve 22 is inserted in the system at the inlet side 23 of the compressor and tapped into the discharge side 11 thereof to automatically maintain a desired constant pressure on the high side of the system over a wide range of compressor speeds so that the compressor speed need not be regulated.

As shown in Figure 2, the valve 22 comprises a casing 27 of metal, shaped to form a super-imposed chamber 28 above and in alignment with a cylindrical chamber 29 which chamber is provided with an inlet port 31 on the inlet side 22a of the valve port and on outlet port 32 on the outlet side 22b of the valve. A passageway 33 for refrigerant flow connects the inlet side 22a of valve 22 with its inlet port 31 and with the low pressure tube 21. A coupling 34 joins the tube 21 to the inlet 22a. A similar passageway 35 is provided through the outlet 22b for refrigerant flow from the low pressure port 32 into the tube 24. A coupling 36 connects the tube 24 with the outlet 22b.

Working within the cylinder 29 is a piston 37 having an annular or peripheral recess 38 which registers with ports 31 and 32 at their orifices 39 and 41 forming an extended flow opening for the refrigerant from the tube 21 into the compressor 6. This register, between the ports 31 and 32, is adjustable to provide an intermediate opening of any desired size, up to the width of the piston recess 38, whereby the flow of refrigerant can be controlled even when the piston 37 is in a fully opened position. The adjustment is accomplished by providing an open ended bracket 42 secured to the bottom of piston 37 for seating against an adjusting screw 43. The screw 43 is threaded through a plug 44 closing the bottom of the cylinder 29. A lock nut 45 can be screwed on the adjusting screw to lock the screw.

Axial movement of the piston 37 is controlled by a rod 46, secured to the top end of the piston, and extending into the super-imposed chamber 28 through a closely fitting guide hole 47, in connecting walls 48 between the chambers 28 and 29. While the drawing illustrates the rod 46 as an integral extension of the piston 37, it can be any metal rod secured to the piston by a weld or screw connection or the like.

The top end of the rod 46 carries seat 49 upon which a pressure responsive diaphragm 51 rests. This diaphragm is secured between the seat 49 and a positioning plate 52 by screws 53 and, as shown, is substantially in a normal position when the piston 37 is bottomed. The chamber 28 comprises two portions, a bottom pressure chamber 54 integrally connected with the lower chamber 29 and a top working chamber 55, the separate chambers being secured together through flanges 56 and 57 by bolts 58. The diaphragm 51 is secured between a pair of cushioning washers 59 and 61 and the flanges 56 and 57 to partition the chamber 28 into the said pressure chamber 54 and the working chamber 55.

A helical spring 63 is mounted between the diaphragm 51 and an apertured guide 64. The guide 64 has a peripheral groove 65 receiving the end coil of the spring. The spring holds the guide 64 against the top wall 62 of the chamber 55.

The distance upwardly which the pressure responsive diaphragm 51 may move is limited by an adjusting screw 66 which is threaded through an adjusting reducer 67. The reducer 67 is threaded through the top wall 62 of the chamber 55. The screw 66 extends fully through the guide 65, limiting the latter as to side movement. A lock nut 68 locks the extended screw 66. Whenever an increase in the pressure exerted by the spring 63 is desired, the reducer 67 is screwed into the chamber 28 to a distance necessary to give the added compression.

As shown in Figure 2, should it be necessary that the compression of the spring 63 be decreased, it may be accomplished by lowering the screw 43, although this procedure will constrict the registerable flow opening between the port orifices 39 and 41 and the piston recess 38 when the piston is bottomed. This, of course, is true only if a further decrease of spring compression is necessary when the said flow openings are in full register with the piston fully bottomed.

Figure 2 illustrates the arrangement of the parts when the piston recess 38 is in true register with the orifice openings 39 and 41 to give an unrestricted fluid flow opening through the valve. Figure 3 indicates the horizontal arrangement of the same parts to illustrate the fluid flow opening through the valve.

The valve 22 is operated by the discharge pressure from the compressor 6 exerted through the tapping tube 25, which is connected to the pressure chamber 54 through an opening 69 by a coupling 71. As the chamber 54 is substantially sealed at the bottom by the rod 46 passing through the guide hole 47, and by the diaphragm 51 at its upper end, pressure in the chamber 54 forces the diaphragm upwardly toward the limiting screw 66. By moving the diaphragm 51, the connected rod 46 and piston 37 move relatively thereto with the piston recess 38 moving out of register with the port orifices 39 and 41, from a position of true register to one completely closing the fluid flow opening. The relative positions of the said parts in fully open and fully closed positions depend, of course, on the top and bottom screw adjustments.

To insure the freedom of moving parts in the valve from working against pressure by pressure leaks or pressure induced by moving parts, the working chamber 55 is provided with a vent 72 to relieve any pressure working into it through the diaphragm 51. Similar relief is provided for any pressure leaking into the chamber 29 from the pressure chamber 54 between the rod 46 and the guide hole 47. In the arrangement illustrated, this comprises a centered vertical hole 73 extending partially through the piston 37 and terminating near the top of the piston in a transversely extended hole 74. Any pressure leaking into the chamber 29 over the piston 37 is then exerted through rather than against the said piston to balance pressures on both sides of the piston.

While in the illustrated embodiment of my invention the fluid flow opening 35 of the valve 22 is connected within the refrigerating system to the inlet side 23 of the compressor with the operating chamber 28 connected to the discharge side 11 thereof, this valve could also be incorporated within the compressor housing to obtain the same results.

When the discharge pressure of the refrigerating system increases by reason of accelerating compressor speeds or by back pressure induced through a change in the rate of condensation or evaporation, it changes the velocity and volume of flowing refrigerant in the system. Consequently, a compressor of large size would be required in order that, at slow speeds, a proper volume of refrigerant could be circulated through the system to accomplish the desired refrigeration. My invention accomplishes this purpose without the aid of large size compressors and independent of any changes in compressor speeds by maintaining a constant compressor discharge pressure which results in the delivery of a constant refrigerating capacity.

As the discharge pressure of the compressor increases and exceeds the compression of the spring 63, the force exerted through line 25 into the pressure chamber 54 and against the diaphragm 51 moves the latter upwardly at a distance dependent upon the difference in pressures on both sides of the diaphragm and limited to a maximum movement by the adjustment screw 66. This upward movement of the diaphragm 51 results in a relative movement of rod 46 and piston 37 to constrict the fluid flow opening between the register of piston recess 38 and the port orifices 39 and 41. By constricting the fluid flow through the valve 22 and the inlet 23 of the compressor 6 less refrigerant is then available to the compressor for compression and immediately the discharge pressure drops to a pressure required for the volume of refrigerant present. Should the compressor speed be constant, the valve 22 immediately adjusts the compressor inlet fluid flow so that the compressor discharge pressure becomes constant; should the compressor speeds vary, the valve immediately adjusts the compressor inlet fluid flow to maintain a constant compressor discharge pressure over a wide range of speeds. This latter adjustment is also made where the compressor discharge pressure varies due to changes in rate of condensation and evaporation.

These adjustments automatically change with changes in compressor discharge pressures, but should necessity require that the valve 22 remain fully open, closed, or partially closed, such adjustments may be made manually by adjusting the screws 66 and 43. If temperature conditions do not require refrigeration, air may be circulated into the vehicle by manually locking the valve 22 in a closed position and allowing the evaporator fan to circulate unrefrigerated air.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A control valve comprising a casing having aligned superimposed chambers, a fluid inlet and a fluid outlet in one of said chambers, a piston in said one chamber between the inlet and outlet, a peripheral recess in said piston for connecting said inlet and outlet when in registry therewith, an axial recess in said piston for maintaining the piston in pressure balance, a screw in the end of said one chamber defining an adjustable seat for said piston, a diaphragm extending entirely across an intermediate portion of the other of said chambers to divide the latter into two compartments, a piston rod connecting said diaphragm and piston, a spring in one of said compartments abutting said diaphragm on the side opposite its connection to said piston, threaded means in said one compartment for adjusting the pressure of said spring, a screw in said threaded means for limiting movement of said diaphragm in one direction, and means for transmitting fluid under pressure, other than from said inlet and outlet in the one chamber, into the other of said compartments and against said diaphragm in opposition to the pressure of said spring, said screws being adjustable for locking said piston in any position and for limiting its movement between positions in which said peripheral recess is either in or out of registry with the inlet and outlet in said one chamber.

2. In a control valve, a casing formed to provide a pair of axially aligned fluid disconnected chambers, one of said chambers having inlet and outlet ports, a piston valve member slidably disposed within said one chamber and having an annular groove adjustably registerable with said inlet and outlet ports for fluid flow therebetween, the other of said chambers being formed of connected half-sections having adjacent ends in spaced relation, a dividing pressure responsive diaphragm extending across said other chamber with its periphery between said adjacent ends of said half-sections, a rod connecting said diaphragm and said piston for co-movement, adjustable compression spring means between said diaphragm and the outer end of said other chamber, and an inlet in the lower portion of said other chamber for admitting fluid under pressure against said diaphragm in opposition to the compression of said spring means, the difference in pressures exerted on said diaphragm by said spring means and said fluid controlling the direction of movement of said piston for moving the annular groove thereof into and out of said registry with the inlet and outlet ports of said one chamber.

RALPH F. PEO.